United States Patent [19]

Murakami

[11] Patent Number: 5,433,419
[45] Date of Patent: Jul. 18, 1995

[54] METHOD FOR FORMING FIBER-REINFORCED MOLDING PELLETS

[75] Inventor: Haruji Murakami, Shizuoka, Japan

[73] Assignee: Polyplastics Co., Ltd., Japan

[21] Appl. No.: 265,620

[22] Filed: Jun. 24, 1994

Related U.S. Application Data

[63] Continuation of Ser. No. 30,098, filed as PCT/JP92/01546, Nov. 26, 1992, abandoned.

[30] Foreign Application Priority Data

Nov. 28, 1991 [JP] Japan .................. 3-314417

[51] Int. Cl.6 ................... B29C 69/00; B29B 9/14
[52] U.S. Cl. ........................ 264/136; 156/166;
156/180; 156/181; 264/140; 264/151; 264/174;
264/320; 264/322; 264/257
[58] Field of Search ............... 156/166, 180, 181;
264/174, 136, 257, 320, 322, 151, 140, 141;
425/114

[56] References Cited

U.S. PATENT DOCUMENTS

| | | | |
|---|---|---|---|
| 3,742,106 | 6/1973 | Price | 264/134 X |
| 3,993,726 | 11/1976 | Moyer | 264/174 |
| 4,058,581 | 11/1977 | Park | 156/166 X |
| 4,439,387 | 3/1984 | Hawley | 425/114 X |
| 4,549,920 | 10/1985 | Cogswell et al. | 156/181 |
| 4,728,387 | 3/1988 | Hilakos | 156/180 X |
| 4,778,367 | 10/1988 | Hilakos | 425/113 |
| 4,820,366 | 4/1989 | Beever et al. | 156/180 X |
| 4,864,964 | 9/1989 | Hilakos | 156/180 X |
| 4,883,625 | 11/1989 | Glemet et al. | 264/136 |
| 5,002,712 | 3/1991 | Goldmann et al. | 264/136 X |
| 5,026,447 | 6/1991 | O'Connor | 156/180 X |
| 5,084,222 | 1/1992 | Glemet et al. | 264/136 |
| 5,084,305 | 1/1992 | Marttila | 118/410 X |
| 5,114,633 | 5/1992 | Stewart | 156/180 X |
| 5,176,775 | 1/1993 | Montsinger | 156/180 X |
| 5,205,898 | 4/1993 | Wilson et al. | 156/181 X |

FOREIGN PATENT DOCUMENTS 2113140 8/1983 United Kingdom ................ 156/180

Primary Examiner—Jeff H. Aftergut
Attorney, Agent, or Firm—Nixon & Vanderhye

[57] ABSTRACT

The production process of the present invention can significantly suppress the fuzzing on the surface of the composite material and substantially prevents the accumulation of fractured fibers in the nozzle causative of the breaking of a strand and so on, so that it becomes possible to enhance the take-up speed of the strand and so on, and can provide a long-fiber-reinforced composite material excellent in the dispersion of the fibers in the composite material and the impregnation of a resin. The process comprises impregnating a continuous reinforcing fiber with a molten thermoplastic resin while pulling the fiber, and is characterized in that, after the fiber is impregnated or coated with a molten resin, the resultant fiber is continuously pultruded while squeezing excess resin and the pultruded fiber is passed through a shaping nozzle to regulate the shape to a desired one.

9 Claims, No Drawings

METHOD FOR FORMING FIBER-REINFORCED MOLDING PELLETS

This is a continuation of application Ser. No. 08/030,098, filed Mar. 11, 1993, now abandoned.

FIELD OF THE INVENTION

The present invention relates to a process for producing a thermoplastic resin composite material reinforced with a long fiber material.

RELATED ART

In recent years, pultrusion has attracted attention as a process for producing a thermoplastic resin composite material reinforced with a long fiber. Among others, a process which comprises impregnating a continuous reinforcing fiber with a thermoplastic resin in a cross head die while pulling the fiber and shaping the resultant fiber in one step while squeezing excess resin through a circular nozzle or the like to provide a strand or the like has an advantage that not only the operation but also the control of the fiber content is easy. Specific examples of this type of process include one disclosed in Japanese Patent Publication-B 49-41105 wherein a continuous fiber is passed through a cross head die. Further, U.S. Pat. No. 4,439,387 discloses a process wherein a fiber is effectively impregnated with a molten resin by using a wavy cross head.

These processes, which comprise impregnating a continuous fiber with a molten thermoplastic resin by means of a cross head and conducting shaping in one step by means of a circular nozzle and the like, have the following drawbacks.

The first problem is that part of the continuous fiber is fractured within the cross head die to cause the fractured fiber to appear as a fuzz on the surface of the strand pulled out of the die, which deteriorates the appearance of the product. Further, the fractured continuous fiber accumulates within the die to cause clogging at the circular nozzle section, so that the strand pulled out of the die, as such, is broken, thus leading to a failure in the operation.

The second problem is that it is difficult to sufficiently impregnate the fiber with the resin by the impregnation by means of a cross head followed by the one-step shaping by means of a circular nozzle. On the other hand, in order to improve the impregnation and stabilize the operation, studies have been made on a method wherein the impregnation is accelerated by reducing the molecular weight of the matrix resin to be used to thereby lower the melt viscosity or using a thermoplastic resin having a high molecular weight and heating it at a high temperature to reduce the melt viscosity thereof. However, no sufficient improvement in the properties can be attained because the matrix resin has a low molecular weight in the former method and the resin is thermally decomposed at a high temperature in the latter method.

Another known method comprises passing a continuous fiber in a bath of a molten thermoplastic resin, sandwiching the fiber between rollers or belts to promote the impregnation and then conducting shaping. This method, however, has problems such that it is difficult to control the fiber content and the operation becomes more or less complicated.

As described above, the conventional processes for producing a long-fiber-reinforced composite material through pultrusion have respective problems, so that the development of a production process whereby the operation can be conducted in a stable and controlled manner while maintaining excellent properties as a composite material reinforced with a long fiber.

DISCLOSURE OF THE INVENTION

Under these circumstances, the present inventors have made intensive studies with a view to producing a long-fiber-reinforced composite material free from fuzzing and having excellent properties through a stable operation by solving the above problems of the processes for producing a long-fiber-reinforced composite material by impregnating a continuous reinforcing fiber bundle with a molten thermoplastic resin while pulling the bundle and, as a result, have found that it is effective to pull first the continuous fiber impregnated with a resin through a slit die, which has led to the completion of the present invention.

Thus, the present invention relates to a process for producing a long-fiber-reinforced composite material by impregnating a continuous reinforcing fiber with a molten thermoplastic resin while pulling the fiber, characterized in that, after the fiber is impregnated or coated with a molten resin, the resultant fiber is continuously pulled while squeezing excess resin by means of a slit nozzle and the pulled fiber is passed through a shaping nozzle to regulate the shape to a desired one.

The production process of the present invention will now be described.

In the present invention, in producing the composite material reinforced with a long fiber, a wound fiber bundle applied in the form of a roving package, a cake or the like is generally used as a reinforcing fiber.

The continuous fiber withdrawn from the fiber bundle is preferably opened by means of a tension roll, a tension bar or the like, and introduced into a molten thermoplastic resin to be impregnated or coated with the resin.

There is no particular limitation on the impregnation method, and it is possible to use any of known impregnation methods such as a method wherein a cross head die is used and a method wherein an impregnation bath is used. The use of a cross head die is particularly preferred from the viewpoint of the operation.

In the present invention, the continuous fiber impregnated with the molten resin is continuously pulled out while squeezing excess resin through a slit nozzle. Thus, the present invention is characterized in that after the impregnation of the fiber with a molten resin, the impregnated fiber is first pulled out through a slit nozzle.

The shape of the slit nozzle must be selected appropriately depending upon the number of fiber bundles used, the amount of the resin for impregnation (in other words, the fiber content) and so on, and cannot be unconditionally specified. However, it is effective to select such a shape that the nozzle can squash the fiber bundle flat in such a manner that the overlapping of individual filaments can be minimized and the bundle has a thickness which allows the squeezing of the impregnating resin. From this point of view, when a pultruded article having a large final cross-sectional area is intended, the thickness of the slit nozzle is generally preferably 10 mm or less, particularly preferably 5 mm or less. On the other hand, when the impregnated fiber is finally shaped into a strand or a thin-walled sheet or tape and pulled out, the thickness of the slit nozzle is preferably 2 mm or less, particularly preferably 1 mm or less. This brings about also an impregnation acceleration effect. Thus, when a slit nozzle is used for squeezing excess resin after the impregnation, the lateral direction of the slit becomes continuous, so that the fracture of the fiber causative of fuzzing becomes less liable to occur and, at the same time, even when the fracture of the fiber occurs, such a fiber can be easily discharged without causing accumulation, which gives rise to the above effect.

In the present invention, it is preferred to use the slit nozzle together with a cross head die for use in the resin impregnation. The use of a cross head die provided with a slit nozzle at its tip is particularly preferred. The above method can remarkably remedy the drawbacks of the cross head die, such as impregnation, fuzzing and so on, while maintaining the feature of the cross head die, that is, easy control of the fiber content.

Further, in the present invention, it is also possible to provide rolls and the like between the slit nozzle and the succeeding shaping die for the purpose of further accelerating the impregnation by the pushing force of the rolls and the like.

The continuous fiber thus impregnated with a molten resin and pulled out in the form of a ribbon or sheet through a slit nozzle is, if necessary, divided into a plurality of strands according to the purpose, further passed through a shaping die to regulate the shape to a desired one, for example, a strand, rod, ribbon, tape, sheet or a special shape according to the purpose, and taken up on a take-up roll or the like to provide a long-fiber-reinforced composite material. The resultant composite materials having various shapes can be applied as such or after being cut into any length to molding or other processing. The production process according to the present invention is effective particularly in the production of a composite material in the strand form or a composite material in the pellet form produced by cutting the composite material in the strand form.

As described above, the feature of the present invention resides in the process for producing a long-fiber-reinforced composite material, and there is no particular limitation on the composition, for example, the kind of the reinforcing fiber, fiber content, the kind of resin and so on.

For example, any of high-melting (high-softening) fiber, such as glass, carbon, metallic or aromatic polyamide fibers, may be used as the reinforcing fiber. The reinforcing fiber may be in any form so far as it is continuous, such as a roving, yarn or monofilament. It is also possible to use a combination of two or more kinds of fibers. These fibers may be one treated with a known surface treatment. Although the amount of incorporation of these resins may be arbitrary, it is preferably 20 to 80% by weight (based on the composition), particularly preferably 30 to 70% by weight (based on the composition) from the viewpoint of various properties of the resultant composite material. Examples of the thermoplastic resin used for the impregnation include any of known thermoplastic resins, their copolymers and modifications, for example, polyethylene, polypropylene, polyesters such as polyethylene terephthalate and polybutylene terephthalate, polyamides such as nylon 6, nylon 66, nylon 11, nylon 12, nylon 610 and nylon 612, polyacetal, polycarbonate, polyurethane, polyphenylene sulfide, polyphenylene oxide, polysulfone, polyether ketone, polyether amide and polyether imide.

Further, it is also possible to apply the present invention to tile production of a long-fiber-reinforced composite material which further contains various materials generally added to resins according to the purpose and application, for example, stabilizers such as an antioxidant, heat stabilizer and ultraviolet absorber, antistatic agents, lubricants, plasticizers, release agents, flame retardants, flame retarding aids, crystallization accelerators, colorants such as dye and pigment, and particulate or sheetlike inorganic fillers or organic fillers.

The process of the present invention serves to attain satisfactory impregnation and fuzzing prevention effect without resort to any conventional means causative of a lowering in tile properties conducted for enhancing the impregnation and preventing the fuzzing, such as the rise of a resin having a low molecular weight and the impregnation at a high temperature. Further, according to the present invention, a satisfactory effect can be attained even when the take-up speed of the continuous fiber is increased, in other words, even when the take-up speed of the resultant composite material is increased, which contributes to an improvement in the productivity.

As is apparent from the foregoing description, the process for producing a long-fiber-reinforced composite material according to the present invention serves to suppress significantly the fuzzing on the surface of the composite material caused by local fracture of the fiber during resin impregnation or squeezing of excess resin by means of a nozzle and, at the same time, to minimize the accumulation of the fractured fibers in the nozzle causative of the breaking of a strand and so on, so that it becomes possible to enhance the take-up speed of the strand and so on, which contributes to a remarkable improvement in the productivity. Further, the dispersion of the fibers in the resultant composite material and the impregnation with tile resin are also good.

Thus, the process for producing a long-fiver-reinforced composite material according to the present invention can provide a high-quality composite material stably at a high efficiency, which renders the present invention very valuable from the industrial viewpoint.

EXAMPLES

The present invention will now be described in more detail with reference to the following Examples, though it is not limited to these Examples only.

Examples 1 to 3 and Comparative Examples 1 and 2

Ten rovings of glass fibers were opened and pulled through a cross head die provided with a slit nozzle (thickness: 0.6 mm) at its tip while impregnating the fibers with a polypropylene resin separately fed into the cross head die from an extruder. The impregnated fibers were pulled out while squeezing excess resin by means of the slit nozzle. The resin-impregnated fibers which had been pulled out in sheet from were separated into 10 streams, which were each shaped by means of a circular nozzle (diameter: 2.8 mm) into a strand and cut into pellets having a length of 12 mm. In this case, the fiber content was regulated to 40% by weight.

Separately, for comparison, the impregnation and shaping were conducted in one step by using a cross head die provided with a circular nozzle (diameter: 2.8 mm, 10 ports) to provide a composite material in pellet form.

The obtained composite materials were evaluated by the following methods and the results are given in Table 1.

(State of Fuzzing)

The state of fuzzing on the surface of the composite material taken up from the slit nozzle and circular nozzle was observed with the naked eye.

(Amount of Fuzzing)

The weight of fuzz separated at the slit nozzle and the circular nozzle during the operation was measured and expressed in terms of a value per 10 kg of the amount of production.

(Breaking of Strand)

Measurement was conducted on the frequency at which the fractured fibers were accumulated in the slit nozzle and circular nozzle to clog these nozzles to thereby break the strand.

(State of Dispersion of Fibers in Pellet)

The state of dispersion of tile fibers in the cross section of the pellet was observed. When a flat plate was molded from pellets wherein the fibers are unevenly dispersed, partial uneven dispersion was observed also in the molded article.

TABLE 1

|  | Ex. 1 | Comp. Ex. 1 | Ex. 2 | Ex. 3 | Comp. Ex. 2 |
| --- | --- | --- | --- | --- | --- |
| Compsn.: polypropylene | 60 wt % | 60 wt % | 60 wt % | 60 wt % | 60 wt % |
| glass | 40 wt % | 40 wt % | 40 wt % | 40 wt % | 40 wt % |
| Die nozzle | slit | circular | slit | slit | circular |
| No. of revolutions of take-up motor (take-up speed) | 100 rpm | 100 rpin | 200 rpm | 300 rpm | 200 rpm |
| Operation time (hr) | 4 | 4 | 8 | 8 | 8 |
| Amt. of fuzz (g)/amt. of prodn. (kg) | 1 g/10 kg | 25 g/10 kg | 1.4 g/10 kg | 2 g/10 kg | more than 30 g/10 kg |
| Breaking of strand | none | none | none | none | some (frequent) |
| State of fuzzing | small | large | small | small | extreme |
| State of dispersion of fibers | good | uneven | good | good | uneven |

As is apparent from the above results, the method wherein shaping is conducted after squeezing excessive resin by means of a slit nozzle is less liable to cause of fuzzing to improve the value of the product and gives rise to neither fuzzing nor breaking of the strand even in the case of an increase in the take-up speed to remarkably improve the productivity.

Besides the above-described evaluation, the tensile strength and impact strength were measured according to ASTM. As a result, scarcely any difference in the tensile strength and impact strength was observed between the Examples and the Comparative Examples.

I claim:

1. A method of forming long-fiber-reinforced molding pellets which substantially prevents fiber breakage and attendant fuzzing of broken fibers on the surface of the molding pellets, said method comprising the steps of:
   (i) impregnating a continuous reinforcing fiber material with a molten thermoplastic resin; an
   (ii) shaping the resin-impregnated continuous reinforcing fiber material to form molding pellets having a circular cross-section without substantial fiber breakage so as to prevent fuzzing of the fiber on the surface of the molding pellets, wherein said step of shaping the resin-impregnated continuous reinforcing fiber material includes the sequential steps of:
   (a) pulling the resin-impregnated continuous reinforcing fiber material through a slit-shaped pultrusion cross-head die which is dimensioned in such a manner as to minimize overlapping of individual fibers of the continuous reinforcing fiber material and thereby substantially prevent fiber breakage while permitting the resin-impregnated continuous reinforcing fiber to be squeezed sufficiently to remove excess resin and to thereby form a continuous resin-impregnated fiber-reinforced ribbon;
   (b) introducing the continuous resin-impregnated fiber-reinforced ribbon into a downstream circular shaping die so as to form a strand thereof having a circular cross-section; and thereafter
   (c) cutting the strand to form molding pellets of predetermined length.

2. A method as in claim 1, wherein between steps (a) and (b) there is practiced the step of (ai) separating the ribbon into a plurality of ribbon streams.

3. A method as in claim 2, wherein each said ribbon stream is introduced into a circular shaping die.

4. A method as in claim 1, further comprising passing the ribbon through rollers downstream of said slit-shaped pultrusion cross-head die but upstream of said shaping die to assist in the impregnation of the fiber reinforcing material with the thermoplastic resin.

5. A method as in claim 1, wherein the slit-shaped cross-head die has a thickness dimension of 5 mm or less.

6. A method as in claim 1, wherein the slit-shaped cross-head die has a thickness dimension of 2 mm or less.

7. A method as in claim 1, wherein the slit-shaped cross-head die has a thickness dimension of 1 mm or less.

8. A method as in claim 1, wherein step (i) is practiced such that the thermoplastic resin is present in the pellets in an amount between 20 to 80% by weight.

9. A method as in claim 8, wherein the thermoplastic resin is at least one resin selected from the group consisting of polyethylene, polypropylene, polyester, polyamide, polyacetal, polycarbonate, polyurethane, polyphenylene sulfide, polyphenylene oxide, polysulfone, polyether ketone, polyether amide and polyether imide.

* * * * *